United States Patent Office 3,301,748
Patented Jan. 31, 1967

3,301,748
METHOD OF CONTROLLING BACTERIA AND FUNGI
Francis X. O'Shea, Wolcott, Bogislav Von Schmeling, Hamden, and Mitchell D. Dudarevitch, Cheshire, Conn., assignors to United States Rubber Company, New York, N.Y., a corporation of New Jersey
No Drawing. Filed June 9, 1965, Ser. No. 462,717
17 Claims. (Cl. 167—30)

This invention relates to bactericides and fungicides, more particularly to agricultural and industrial microbicides.

The chemicals of the present invention which show such biocidal activity may be represented by the general formula:

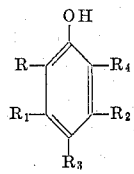

wherein R is an alkyl radical of up to 12 carbon atoms or a cycloalkyl radical of 5 to 8 carbon atoms or an aralkyl radical of 7 to 9 carbon atoms, $R_1$ and $R_2$ are hydrogen or methyl, and $R_3$ and $R_4$ are alkyl radicals of up to 12 carbon atoms each or cycloalkyl radicals of 5 to 8 carbon atoms each or aralkyl radicals of 7 to 9 carbon atoms each or the group

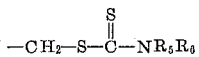

in which $R_5$ and $R_6$ are alkyl radicals having up to 3 carbon atoms each or are radicals in which $R_5$ and $R_6$ are joined to form with the nitrogen atom a radical selected from the group consisting of morpholinyl, pyrrolidinyl and piperidinyl radicals, and at least one of $R_3$ and $R_4$ is the group

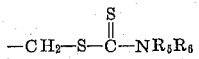

The class of compounds of the present invention are known chemicals and are described in the following references:

Hardman—U.S. Patent 2,757,174; patented July 31, 1956;
Turner—U.S. Patent 3,117,947, patented Jan. 14, 1964;
Pattison and Woodhams, J. App. Chem. 6, 161–168 (1956).

The compounds may be prepared by treating one molar equivalent of a phenolic Mannich base of the formula

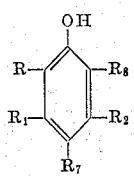

wherein R, $R_1$ and $R_2$ are as above defined, and $R_7$ and $R_8$ are alkyl radicals of up to 12 carbon atoms each or cycloalkyl radicals of 5 to 8 carbon atoms each or aralkyl radicals of 7 to 9 carbon atoms each or the group

wherein $R_5$ and $R_6$ are as above defined, at least one of $R_7$ and $R_8$ being the group —$CH_2NR_5R_6$, with at least one molar equivalent of carbon disulfide when only one of $R_7$ and $R_8$ is the group —$CH_2NR_5R_6$, or with at least two molar equivalents of carbon disulfied when each of $R_7$ and $R_8$ is the group —$CH_2NR_5R_6$. Such phenolic Mannich bases are prepared by reacting the selected hydrocarbon substituted phenol with formaldehyde and the selected secondary amine in the manner described by Hardman, U.S. Patent 2,757,174. In the case of the compounds of the present invention derived from 2,6-dialkylphenols, the chemicals may be prepared directly from the phenol by reaction with formaldehyde, a secondary amine and carbon disulfide in the manner described by Turner, U.S. Patent 3,117,947.

The hydrocarbon substituted phenols which may be used to prepare the intermediate phenolic Mannich bases include o-cresol,
o-ethylphenol,
o-isopropylphenol,
o-sec-butylphenol,
o-t-butylphenol,
o-t-amylphenol,
o-($\alpha$-methylpentyl)phenol,
o-($\alpha$-methylheptyl)phenol,
o-($\alpha$-methylnonyl)phenol,
o-($\alpha$-methylundecyl)phenol,
o-cyclohexylphenol,
o-(methylcyclohexyl)phenol,
o-($\alpha$-methylundecyl)phenol,
o-cyclooctylphenol,
o-benzylphenol,
o-($\alpha$-methylbenzyl)phenol,
o-($\alpha,\alpha$-dimethylbenzyl)phenol,
2,3-dimethylphenol,
2,5-dimethylphenol,
2,3,5-trimethylphenol,
6-isopropyl-m-cresol,
2-isopropyl-3,5-dimethylphenol,
6-t-butyl-m-cresol,
2-t-butyl-3,5-dimethylphenol,
6-sec-butyl-m-cresol,
2-sec-butyl-3,5-dimethylphenol,
6-t-amyl-m-cresol,
6-t-amyl-3,5-dimethylphenol,
6-($\alpha$-methylpentyl)-m-cresol,
2-($\alpha$-methylpentyl)-3,5-dimethylphenol,
6-($\alpha$-methylheptyl)-m-cresol,
2-($\alpha$-methylheptyl)-3,5-dimethylphenol,
6-($\alpha$-methylnonyl)-m-cresol,
2-($\alpha$-methylnonyl)-3,5-dimethylphenol,
6-($\alpha$-methylundecyl)-m-cresol,
2-($\alpha$-methylundecyl)-3,5-dimethylphenol,
6-t-octyl-m-cresol,
2-t-octyl-3,5-dimethylphenol,
6-cyclohexyl-m-cresol,
2-cyclohexyl-3,5-dimethylphenol,
6-cyclooctyl-m-cresol,
2-cyclooctyl-3,5-dimethylphenol,
6-benzyl-m-cresol,
2-benzyl-3,5-dimethylphenol,
6-($\alpha$-methylbenzyl)-m-cresol,
2-($\alpha$-methylbenzyl)-3,5-xylenol,
6-($\alpha,\alpha$-dimethylbenzyl)-m-cresol,
2-($\alpha,\alpha$-dimethylbenzyl)-3,5-xylenol,
2,6-xylenol,
2,6-diisopropylphenol,
2-methyl-6-sec-butylphenol,
2,6-di-sec-butylphenol,
2-methyl-6-t-butylphenol,
2,6-di-t-butylphenol, 2-methyl-6-(α-methylpentyl)phenol,
2,6-di-(α-methylpentyl)phenol,
2-methyl-6-(α-methylheptyl)phenol,
2,6-di-(α-methylheptyl)phenol,
2-methyl-6-(α-methylnonyl)phenol,
2,6-di-(α-methylnonyl)phenol,
2-methyl-6-(α-methyl-undecyl)phenol,
2,6-di(α-methylundecyl)phenol,
2-methyl-6-t-octylphenol,
2-methyl-6-cyclohexylphenol,
2-methyl-6-cyclooctylphenol,
2,6-di(cyclooctyl)phenol,
2-methyl-6-(α-methylbenzyl)phenol,
2-methyl-6-(α,α-dimethylbenzyl)phenol,
2,4-xylenol,
2-methyl-4-t-butylphenol,
2-t-butyl-4-methylphenol,
2,4-di-t-butylphenol,
2-methyl-4-cyclohexyphenol,
2-cyclohexyl-4-methylphenol,
2,4-dicyclohexylphenol,
2-methyl-4-t-octylphenol,
2-t-octyl-4-methylphenol,
2,4-di-t-octylphenol,
2-nonyl-4-methylphenol,
2-methyl-4-nonylphenol,
2,4-dinonylphenol,
2-dodecyl-4-methylphenol,
2-methyl-4-dodecylphenol,
2,4-didodecylphenol,
2-methyl-4-(α-methylbenzyl)phenol,
2-(α-methylbenzyl)-4-methylphenol,
2,4-di(α-methylbenzyl)phenol,
2-methyl-4-(α,α-dimethylbenzyl)phenol,
2-(α,α-dimethylbenzyl)-4-methylphenol,
2,4-di(α,α-dimethylbenzyl)phenol,
2,3,5,6-tetramethylphenol,
2,6-di-sec-butyl-3,5-dimethylphenol and
2,6-di-(α-methylundecyl)-3,5-dimethylphenol.

The preferred phenols are 2,6-dialkylphenols in which the alkyl groups contain from one to four carbon atoms each such as 2,6-xylenol and 2-methyl-6-t-butylphenol. The secondary amines which may be used include dimethylamine, methylethylamine, diethylamine, methyl-n-propylamine, methyl-isopropylamine, di-n-propylamine, di-isopropylamine, ethyl-n-propylamine, ethyl-isopropylamine, morpholine, pyrrolidine and piperidine. The preferred amine is dimethylamine.

The following chemicals are illustrative of the compounds of the present invention using the above referred hydrocarbon substituted phenols and secondary amines in their preparation:

3-methyl-4-hydroxy-5-t-butylbenzyl N,N-dimethyldithiocarbamate
3-methyl-4-hydroxy-5-cyclooctyl N,N-dimethyldithiocarbamate
2-hydroxy-3-methyl-5-t-butylbenzyl N,N-dimethyldithiocarbamate
2-hydroxy-3-t-butyl-5-methylbenzyl N,N-dimethyldithiocarbamate
2,6-di-t-butyl-4-(morpholinothiocarbonylthiomethyl)phenol
3,5-dimethyl-4-hydroxybenzyl N,N-dimethyldithiocarbamate
2-hydroxy-3-(alpha,alpha-dimethylbenzyl)-5-methylbenzyl N,N-dimethyldithiocarbamate
2-hydroxy-3,5-dimethylbenzyl N,N-dimethyldithiocarbamate
3-methyl-4-hydroxy-5-t-butylbenzyl N,N-di-n-propyldithiocarbamate
2,6-di-t-butyl-4-(piperidinothiocarbonylthiomethyl)phenol
2-t-butyl-4,6-bis(dimethylthiocarbamylthiomethyl)phenol
2-methyl-4,6-bis(dimethylthiocarbamylthiomethyl)phenol
2,3,5,6-tetramethyl-4-hydroxybenzyl N,N-dimethyldithiocarbamate
3,5-diisopropyl-4-hydroxybenzyl N,N-dimethyldithiocarbamate
3,5-di-t-butyl-4-hydroxybenzyl N,N-dimethyldithiocarbamate
3,5-dicyclooctyl-4-hydroxybenzyl N,N-dimethyldithiocarbamate
3,5-di-sec-butyl-4-hydroxybenzyl N,N-dimethyldithiocarbamate
3-methyl-4-hydroxy-5-t-butylbenzyl N-ethyl-N-isopropyldithiocarbamate
2-hydroxy-3,5-di-t-butylbenzyl N,N-dimethyldithiocarbamate
2-hydroxy-3-t-octyl-5-methylbenzyl N,N-dimethyldithiocarbamate
2-hydroxy-3-(alpha-methylbenzyl)-5-methylbenzyl N,N-dimethyldithiocarbamate
2-hydroxy-3-(alpha,alpha-dimethylbenzyl)-5-methylbenzyl N,N-dimethyldithiocarbamate
2,6-dimethyl-4-(morpholinothiocarbonylthiomethyl)phenol
2-methyl-4-(piperidinothiocarbonylthiomethyl)-6-t-butylphenol
2,6-dimethyl-4-(piperidinothiocarbonylthiomethyl)phenol
2,4-bis(dimethylthiocarbamylthiomethyl)-6-isopropylphenol
2,4-bis(dimethylthiocarbamylthiomethyl)-6-sec-butylphenol
2,3-dimethyl-4-hydroxy-5-t-butylbenzyl N,N-dimethyldithiocarbamate
2-hydroxy-3,6-dimethyl-5-dodecylbenzyl N,N-dimethyldithiocarbamate
2,4-bis(dimethylthiocarbamylthiomethyl)-3,6-dimethylphenol
2,3-dimethyl-4,6-bis(dimethylthiocarbamylthiomethyl)phenol
2-methyl-4-(pyrrolidinethiocarbonylthiomethyl)-6-t-butylphenol.

The following examples illustrate the invention. All parts referred to herein are by weight.

*Example 1*

This example demonstrates the effectiveness of the chemicals of this invention as agricultural protective fungicides as tested against *Alternaria solani*, the causal organism of tomato early blight.

Sixteen hundredths (0.16) gram of the chemical to be tested was dissolved in 20 ml. of acetone and 60 mg. of non-ionic surface-active agent (a condensaton product of an alkyl phenol and ethylene oxide). The acetone and surface-active agent are known to be inactive in the biological tests run. The mixture was diluted serially with distilled water, giving suspensions containing 50, 200 and 800 parts per million of the chemical. These suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate 1 ml. per second). The plants were then kept overnight in a control chamber at a temperature of 75° F. and 100% relative humidity. In the morning the plants were transferred to the greenhouse. Three days later the disease was scored by comparing the number of disease lesions of the treated plants with the untreated check.

The formula to determine percent control is:

$$100 - \left(\frac{\text{Ave. No. lesions on treated plant}}{\text{Ave. No. lesions on untreated plant}} \times 100\right) = \text{percent control}$$

The results of the tests are shown in the following table:

| Compound | Percent Disease Control At— | | |
|---|---|---|---|
| | 50 p.p.m. | 200 p.p.m. | 800 p.p.m. |
| 3-methyl-4-hydroxy-5-t-butylbenzyl N,N-dimethyldithiocarbamate | 91 | 95 | 97 |
| 3,5-dimethyl-4-hydroxybenzyl N,N-dimethyldithiocarbamate | 76 | 87 | 87 |
| 3,5-diisopropyl-4-hydroxybenzyl N,N-dimethyldithiocarbamate | 55 | 76 | 86 |
| 3,5-di-t-butyl-4-hydroxybenzyl N,N-dimethyldithiocarbamate | 56 | 62 | 75 |
| 3-methyl-4-hydroxy-5-cyclooctylbenzyl N,N-dimethyldithiocarbamate | 80 | 91 | 97 |
| 3,5-dicyclooctyl-4-hydroxybenzyl N,N-dimethyldithiocarbamate | 81 | 80 | 91 |
| 3,5-di-sec-butyl-4-hydroxybenzyl N,N-dimethyldithiocarbamate | 74 | 88 | 92 |
| 3-methyl-4-hydroxy-5-t-butylbenzyl N-ethyl-N-isopropyldithiocarbamate | 50 | 51 | 59 |
| 2-hydroxy-3,5-dimethylbenzyl N,N-dimethyldithiocarbamate | 81 | 88 | 96 |
| 2-hydroxy-3-methyl-5-t-butylbenzyl N,N-dimethyldithiocarbamate | 48 | 61 | 70 |
| 2-hydroxy-3-t-butyl-5-methylbenzyl N,N-dimethyldithiocarbamate | 64 | 70 | 90 |
| 2-hydroxy-3,5-di-t-butylbenzyl N,N-dimethyldithiocarbamate | 53 | 53 | 70 |
| 2-hydroxy-3-t-octyl-5-methylbenzyl N,N-dimethyldithiocarbamate | 81 | 82 | 84 |
| 2-hydroxy-3-($\alpha$-methylbenzyl)-5-methylbenzyl N,N-dimethyldithiocarbamate | 83 | 76 | 84 |
| 2-hydroxy-3-methyl-5-($\alpha,\alpha$-dimethylbenzyl)benzyl N,N-dimethyldithiocarbamate | 79 | 91 | 92 |
| 2-hydroxy-3-($\alpha,\alpha$-dimethylbenzyl)-5-methylbenzyl N,N-dimethyldithiocarbamate | 84 | 88 | 92 |
| 2,6-dimethyl-4-(morpholinothiocarbonylthiomethyl)phenol | 76 | 81 | 91 |
| 2,6-dimethyl-4-(piperidinothiocarbonylthiomethyl)phenol | 56 | 37 | 89 |
| 2-methyl-4-(piperidinothiocarbonylthiomethyl)-6-t-butylphenol | 52 | 46 | 65 |
| 2,6-di-t-butyl-4-(piperidinothiocarbonylthiomethyl)phenol | 34 | 37 | 60 |
| 2,6-di-t-butyl-4-(morpholinothiocarbonylthiomethyl)phenol | 49 | 65 | 75 |
| 2,4-bis(dimethylthiocarbamylthiomethyl)-6-t-butylphenol | 45 | 57 | 70 |
| 2,4-bis(dimethylthiocarbamylthiomethyl)-6-isopropylphenol | 61 | 67 | 74 |
| 2,4-bis(dimethylthiocarbamylthiomethyl)-6-sec.-butylphenol | 62 | 65 | 78 |
| 2,4-bis(dimethylthiocarbamylthiomethyl)-6-methylphenol | 68 | 82 | 90 |
| | 125 p.p.m. | 500 p.p.m. | 2,000 p.p.m. |
| 2,3,5,6-tetramethyl-4-hydroxybenzyl N,N-dimethyldithiocarbamate | 53 | 66 | 83 |

*Example 2*

This example illustrates the effectiveness of the chemicals of this invention as industrial bactericides as tested against the anaerobic bacterium *Desulfovibrio desulfuricans*, a deteriorative agent in secondary oil recovery procedures, fuel storage tanks, pipelines, etc. This test was conducted according to the American Petroleum Institute "Recommended Practice for Biological Analysis of Water-Flood Injection Waters," API–Rp 38, first edition, May 1959, Section II. In the test, weighed portions of the compounds were dissolved in 10 ml. of an appropriate solvent (acetone, isopropanol, distilled water), transferred to 90 ml. of distilled water containing three drops per liter of a non-ionic surface-active agent (isooctyl phenyl polyethoxy ethanol). Aliquots were removed from this stock solution (usually containing 1,000 or 100 p.p.m. of chemical) to sterile, screw-capped, clear one-ounce bottles sufficient to obtain a final concentration of 1, 5, 10, 50 and 100 p.p.m.

To each bottle was added sulfate reducing broth inoculated with *Desulfovibrio desulfuricans* (1.5%). The recipe for the sulfate reducing broth was as follows:

Sodium lactate, U.S.P. _____ mls__ 4.0
Yeast extract _____ gm__ 1.0
Ascorbic acid _____ gm__ 0.1
$MgSO_4 \cdot 7H_2O$ _____ gm__ 0.2
$K_2HPO_4$ (anhydrous) _____ gm__ 0.01
$Fe(SO_4)_2 (NH_4)_2 \cdot 6H_2O$ _____ gm__ 0.1
Sodium chloride _____ gms.__ 10.0
Distilled water _____ mls__ 1000.0
PH adjusted to 7.5.

The caps were replaced and the bottles incubated at 32–35° C. with daily observations for one week and weekly observations thereafter for a total of 4 weeks' incubation.

The results of the test are shown in the following table:

| Compound | Concentration (in p.p.m.) | | | | |
|---|---|---|---|---|---|
| | 100 | 50 | 10 | 5 | 1 |
| 3-methyl-4-hydroxy-5-t-butylbenzyl N,N-dimethyl dithiocarbamate | − | − | − | − | + |
| 3,5-dimethyl-4-hydroxybenzyl N,N-dimethyldithiocarbamate | − | − | − | − | + |
| 2,4-bis(dimethylthiocarbamylthiomethyl)-6-t-butylphenol | − | − | − | + | + |
| 2,6-dimethyl-4-(morpholinothiocarbonylthiomethyl) phenol | − | − | + | + | + |
| 2,6-di-t-butyl-4-(morpholinothiocarbonylthiomethyl) phenol | − | − | + | + | + |
| 2,6-dimethyl-4-(piperidinothiocarbonylthiomethyl) phenol | − | − | + | + | + |
| 2-methyl-4-(piperidinothiocarbonylthiomethyl)-6-t-butylphenol | − | − | + | + | + |
| 2,4-bis(dimethylthiocarbamylthiomethyl)-6-methylphenol | − | − | − | + | + |
| 2,3,5,6-tetramethyl-4-hydroxybenzyl N,N-dimethyldithiocarbamate | − | − | + | + | + |

+ = Growth and Media Blackening.
− = No Growth or Blackening.

*Example 3*

This example demonstrates the effectiveness of the chemicals of this invention as material preservatives against the various degradative bacteria and fungi causing deterioration of textiles, paper, wood, etc.

Samples of ten-ounce cotton duck were treated with acetone solutions of the chemicals and dried at 60–65° C. for 15 minutes, giving a deposition of 1% by weight of the chemical on the fibers. Generally 0.1% to 10% of the chemical based on the weight of the material being treated will be used in practice. Samples were then tested according to Federal Specification CCC–T–191b, Textile Test Methods, Method 5751, Non-sterile Specimen Method. The test was carried out as follows: Treated and untreated (control) 2 x 2 inch squares of the duck were placed individually on sterile, hardened mineral salts agar in petri dishes. The squares were then inoculated with 2.0 ml. of a fungal spore suspension of *Chaetomium globosum* USDA 1042.4. The dishes were incubated for 14 days at 28–30° C. Unleached samples, and samples leached by 24 hours immersion with six hand changes in water were visually examined for signs of growth with results shown in the following table:

| Compound | Visual Evaluation of Growth | | | |
|---|---|---|---|---|
| | Unleached | | Leached | |
| | 1 week | 2 weeks | 1 week | 2 weeks |
| Control | Heavy | Heavy | Heavy | Heavy. |
| 3-methyl-4-hydroxy-5-t-butylbenzyl N,N-dimethyldithiocarbamate | None | None | None | None. |
| 3,5-dimethyl-4-hydroxybenzyl N,N-dimethyldithiocarbamate | do | do | do | Do. |

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of controlling bacteria and fungi which comprises contacting bacteria and fungi with a compound having the formula:

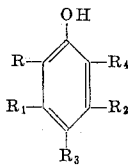

wherein R is alkyl of 1 to 12 carbon atoms, cycloalkyl of 5 to 8 carbon atoms, or aralkyl of 7 to 9 carbon atoms, $R_1$ or $R_2$ are hydrogen and methyl, $R_3$ and $R_4$ are alkyl of 1 to 12 carbon atoms each, cycloalkyl of 5 to 8 carbon atoms each, aralkyl of 7 to 9 carbon atoms each or the group

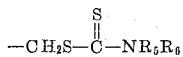

in which $R_5$ and $R_6$ are alkyl having 1 to 3 carbon atoms each or are joined to form with the nitrogen atom morpholinyl, pyrrolidinyl and piperidinyl groups, at least one of $R_3$ and $R_4$ being the group

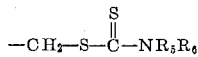

2. The method of controlling bacteria and fungi which comprises applying to loci subject to attack by bacteria and fungi a compound having the formula:

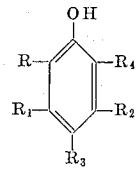

wherein R is alkyl of 1 to 12 carbon atoms, cycloalkyl of 5 to 8 carbon atoms or aralkyl radicals of 7 to 9 carbon atoms, $R_1$ and $R_2$ are hydrogen or methyl, $R_3$ and $R_4$ are alkyl of 1 to 12 carbon atoms each, cycloalkyl of 5 to 8 carbon atoms each and, aralkyl of 7 to 9 carbon atoms each or the group

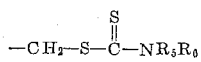

in which $R_5$ and $R_6$ are alkyl having 1 to 3 carbon atoms each or are joined to form with the nitrogen atom morpholinyl, pyrrolidinyl and piperidinyl groups, at least one of $R_3$ and $R_4$ being the group

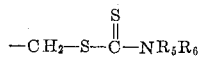

3. The method of controlling fungi on plants which comprises contacting plants with a compound having the formula:

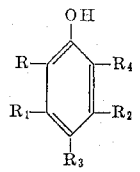

wherein R is alkyl of 1 to 12 carbon atoms, cycloalkyl of 5 to 8 carbon atoms, aralkyl radicals of 7 to 9 carbon atoms, $R_1$ and $R_2$ are hydrogen or methyl, $R_3$ and $R_4$ are alkyl radicals of 1 to 12 carbon atoms each, cycloalkyl of 5 to 8 carbon atoms each, aralkyl radicals of 7 to 9 carbon atoms each, or the group

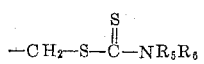

in which $R_5$ and $R_6$ are alkyl radicals having 1 to 3 carbon atoms each or are joined to form with the nitrogen atom morpholinyl, pyrrolidinyl and piperidinyl groups, at least one of $R_3$ and $R_4$ being the group

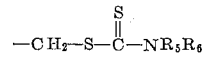

4. The method of protecting material capable of nourishing bacteria and fungi from destruction by such pests which comprises bringing the material into contact with a compound having the formula:

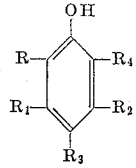

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl radicals of 1 to 12 carbon atoms each, cycloalkyl of 5 to 8 carbon atoms each, aralkyl radicals of 7 to 9 atoms each or the group

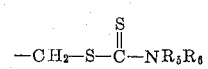

in which $R_5$ and $R_6$ are alkyl having 1 to 3 carbon atoms each are joined to form with the nitrogen atom morpholinyl, pyrrolidinyl and piperidinyl groups, at least one of $R_3$ and $R_4$ being the group

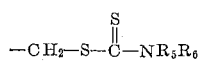

5. Material normally subject to microbiological decomposition but made resistant to such decomposition by having incorporated therein a compound having the formula:

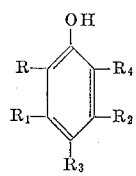

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, $R_3$ and $R_4$ are alkyl of 1 to 12 carbon atoms each, cycloalkyl of 5 to 8 carbon atoms each, aralkyl radicals of 7 to 9 carbon atoms each or the group

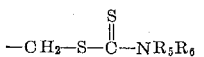

in which $R_5$ and $R_6$ are alkyl radicals having up to 3 carbon atoms each or are joined to form with the nitrogen atom morpholinyl, pyrrolidinyl and piperidinyl groups, at least one of $R_3$ and $R_4$ being the group

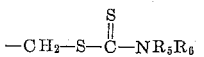

6. Cellulosic material impregnated with a compound having the formula:

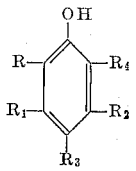

wherein R is alkyl of 1 to 12 carbon atoms, cycloalkyl of 5 to 8 carbon atoms or aralkyl radicals of 7 to 9 carbon atoms, $R_1$ and $R_2$ are hydrogen or methyl, and $R_3$ and $R_4$ are alkyl radicals of 1 to 12 carbon atoms each, cycloalkyl of 5 to 8 carbon atoms each, aralkyl of 7 to 9 carbon atoms each or the group

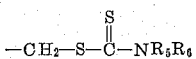

in which $R_5$ and $R_6$ are alkyl radicals having 1 to 3 carbon atoms each or are joined to form with the nitrogen atom morpholinyl, pyrrolidinyl and piperidinyl groups, at least one of $R_3$ and $R_4$ being the group

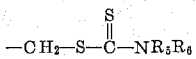

7. Fabric having incorporated therein a compound having the formula:

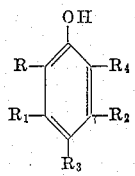

wherein R is alkyl of 1 to 12 carbon atoms, cycloalkyl of 5 to 8 carbon atoms or aralkyl of 7 to 9 carbon atoms, $R_1$ and $R_2$ are hydrogen or methyl, and $R_3$ and $R_4$ are alkyl of 1 to 12 carbon atoms each, cycloalkyl of 5 to 8 carbon atoms each, aralkyl of 7 to 9 carbon atoms each or the group

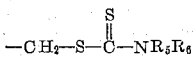

in which $R_5$ and $R_6$ are alkyl having 1 to 3 carbon atoms each or are joined to form with the nitrogen atom of morpholinyl, pyrrolidinyl and piperidinyl groups, at least one of $R_3$ and $R_4$ being the group

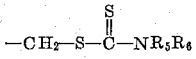

8. The method of controlling microorganisms which comprises applying 3-methyl-4-hydroxy-5-t-butylbenzyl N,N-dimethyldithiocarbamate to a medium which normally supports the growth of bacteria.

9. The method of controlling bacteria which comprises applying 3,5-dimethyl-4-hydroxybenzyl N,N-dimethyldithiocarbamate to a medium which normally supports growth of bacteria.

10. The method of controlling bacteria which comprises applying 3-methyl-4-hydroxy-5-cyclooctylbenzyl N,N-dimethyldithiocarbamate to a medium which normally supports the growth of bacteria.

11. The method of controlling bacteria which comprises applying 2-hydroxy-3-methyl-5-(α,α-dimethylbenzyl)-benzyl N,N-dimethyldithiocarbamate to a medium which normally supports the growth of bacteria.

12. The method of controlling bacteria which comprises applying 2,4-bis(dimethylthiocarbamylthiomethyl)-6-methylphenol to a medium which normally supports the growth of bacteria.

13. The method of controlling fungi on plants which comprises applying 3-methyl-4-hydroxy-5-t-butylbenzyl N,N-dimethyldithiocarbamate to plants.

14. The method of controlling fungi on plants which comprises applying 3,5-dimethyl-4-hydroxybenzyl N,N-dimethyldithiocarbamate to plants.

15. The method of controlling fungi on plants which comprises applying 3-methyl-4-hydroxy-5-cyclooctylbenzyl N,N-dimethyldithiocarbamate to plants.

16. The method of controlling fungi on plants which comprises applying 2-hydroxy-3-methyl-5-(α,α-dimethylbenzyl)-benzyl N,N-dimethyldithiocarbamate to plants.

17. The method of controlling fungi on plants which comprises applying 2,4-bis(dimethylthiocarbamylthiomethyl)-6-methylphenol to plants.

References Cited by the Examiner

UNITED STATES PATENTS 2,757,174   7/1956   Hardman _____ 260—455
3,117,947   1/1964   Turner _____ 260—45.95

OTHER REFERENCES

Pattison: Jour. of Applied Chem., 6 (1956), pages 161–168.

JULIAN S. LEVITT, *Primary Examiner.*

SAM ROSEN, *Examiner.*

STANLEY J. FRIEDMAN, *Assistant Examiner.*

UNITED STATES PATENT OFFICE
CERTIFICATE OF CORRECTION

Patent No. 3,301,748                                January 31, 1967

Francis X. O'Shea et al.

It is hereby certified that error appears in the above numbered patent requiring correction and that the said Letters Patent should read as corrected below.

Column 7, line 14, for "atoms," read -- atoms --; same line 14, after "aralkyl" insert -- radicals --; line 15, for "and", first occurrence, read -- or --; column 7, line 43, after "alkyl" insert -- radicals --; line 44, strike out "and"; line 72, for "each," read -- each --; column 8, line 74, strike out "and", second occurrence' column 9, line 33, strike out "of"; line 39, strike out "micro-organisms" and insert instead -- bacteria --.

Signed and sealed this 17th day of October 1967.

(SEAL)
Attest:

Edward M. Fletcher, Jr.                             EDWARD J. BRENNER
Attesting Officer                                       Commissioner of Patents